United States Patent
Nemura et al.

(10) Patent No.: US 10,146,111 B2
(45) Date of Patent: Dec. 4, 2018

(54) PROJECTOR AND LIGHT ADJUSTER THAT INCLUDES A COVER MEMBER

(71) Applicant: SEIKO EPSON CORPORATION, Tokyo (JP)

(72) Inventors: Akira Nemura, Azumino (JP); Shinichi Wakabayashi, Suwa (JP); Keita Tsukioka, Matsumoto (JP); Satoshi Chikuni, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/655,120

(22) Filed: Jul. 20, 2017

(65) Prior Publication Data
US 2018/0031956 A1   Feb. 1, 2018

(30) Foreign Application Priority Data
Jul. 29, 2016   (JP) ................... 2016-149534

(51) Int. Cl.
| G03B 21/14 | (2006.01) |
| G03B 21/16 | (2006.01) |
| G03B 21/20 | (2006.01) |
| G03B 21/28 | (2006.01) |

(52) U.S. Cl.
CPC ......... *G03B 21/145* (2013.01); *G03B 21/142* (2013.01); *G03B 21/16* (2013.01); *G03B 21/2053* (2013.01); *G03B 21/2066* (2013.01); *G03B 21/28* (2013.01); *G03B 21/2033* (2013.01)

(58) Field of Classification Search
CPC ........... G03B 21/142; G03B 21/145; G03B 21/2066; G03B 21/28; G03B 21/16; G03B 21/2053
See application file for complete search history.

(56) References Cited

U.S. PATENT DOCUMENTS

| 7,798,653 B2 | 9/2010 | Inui et al. |
| 2011/0310358 A1 | 12/2011 | Wakabayashi et al. |
| 2012/0013858 A1* | 1/2012 | Fukunaga ............. G02B 26/02 353/97 |

FOREIGN PATENT DOCUMENTS

| JP | 2012-008184 A | 1/2012 |
| JP | 5002923 B2 | 8/2012 |
| JP | 2014-085368 A | 5/2014 |
| JP | 2016-061992 A | 4/2016 |

* cited by examiner

Primary Examiner — Sultan Chowdhury
Assistant Examiner — Magda Cruz
(74) *Attorney, Agent, or Firm* — Oliff PLC

(57) ABSTRACT

A light adjuster includes: a first light shield and a second light shield disposed across a central axis of an emitted light beam; a drive section; a movement mechanism configured to move the first light shield and the second light shield using a driving force; a board; and a cover member combined with the board, in which the movement mechanism includes: a pinion gear; and a first gear and a second gear configured to be rotated in conjunction with a rotation of the pinion gear, the first light shield is attached to the first gear, the second light shield is attached to the second gear, and the cover member supports the first gear and the second gear so that the first gear and the second gear are rotatable, and is combined with the board to cover the pinion gear, the first gear and the second gear.

22 Claims, 9 Drawing Sheets

PROJECTOR AND LIGHT ADJUSTER THAT INCLUDES A COVER MEMBER

The entire disclosure of Japanese Patent Application No. 2016-149534 filed on Jul. 29, 2016 is expressly incorporated by reference herein.

BACKGROUND

1. Technical Field

The present invention relates to a light adjuster and a projector.

2. Related Art

A projector including a light source, an optical modulator configured to modulate a light emitted from the light source to form an image in accordance with image information, and a projection optical device configured to enlarge and project the image onto a projection surface such as a screen, has been known. A known example of the above projector includes a light adjuster (an optical diaphragm unit) configured to shield a part of the light emitted from the light source to adjust the quantity of the light incident on the optical modulator (see, for instance, Patent Literature 1: JP-B2-5002923).

The optical diaphragm unit of the projector disclosed in Patent Literature 1 includes: a motor provided with a pinion gear; light shield bases A and B each including a gear portion; and a base plate supporting the motor and the light shield bases A and B. Further, the optical diaphragm unit includes a light shield A attached to the light shield base A to partially shield the light emitted from the light source and a light shield B attached to the light shield base B to partially shield the light emitted from the light source. The light shield A and the light shield B are moved toward and away from each other by a force transmitted from the motor via each of the gears to be moved into and out of an optical path to adjust the quantity of the light incident on the optical modulator.

In the optical diaphragm unit of Patent Literature 1, the motor and the light shield bases A and B are supported by the common base plate.

Accordingly, in order to assemble the optical diaphragm unit, the motor and the light shield bases A and B have to be separately attached to the base plate, thereby lowering the work efficiency.

SUMMARY

An object of the invention is to solve at least a part of the above problem and to provide a light adjuster and a projector capable of improving assemblability.

A light adjuster according to a first aspect of the invention includes: a first light shield and a second light shield disposed across a central axis of an emitted light beam and configured to enter the light beam to shield at least a part of the light beam; a drive section configured to generate a driving force; a movement mechanism configured to move the first light shield and the second light shield using the driving force; a board; and a cover member combined with the board, in which the movement mechanism includes: a pinion gear provided to the drive section; and a first gear and a second gear configured to be rotated in conjunction with a rotation of the pinion gear, the first light shield is attached to the first gear, the second light shield is attached to the second gear, and the cover member supports the first gear and the second gear so that the first gear and the second gear are rotatable, and is combined with the board to cover the pinion gear, the first gear and the second gear.

According to the above aspect of the invention, since the pinion gear, the first gear and the second gear are covered with the board and the cover member, adhesion of dust on the gears can be restrained. Accordingly, the movement of the first and second light shields can be kept from being hindered and the reliability of the light adjuster can be improved. Since the noise generated when the gears are rotated can be blocked by the cover member, the sound from the light adjuster can be reduced.

Further, the first and second gears are supported by the cover member. Accordingly, since the cover member and the first and second gears, which are supported by the cover member, are attached at one time to the board during the manufacture of the light adjuster, assemblability of the components can be improved.

In the light adjuster according to the first aspect of the invention, it is preferable that the cover member includes: a body portion attached to the board to cover the pinion gear, the first gear and the second gear; and a support portion provided to the body portion to support the first gear and the second gear so that the first gear and the second gear are rotatable.

According to the above arrangement, the first and second gears can be reliably supported by the cover member.

In the light adjuster according to the first aspect of the invention, it is preferable that the cover member includes: a first opening configured to expose a part of the first gear; and a second opening configured to expose a part of the second gear, the first light shield is attached to the first gear through the first opening, and the second light shield is attached to the second gear through the second opening.

According to the above arrangement, the first light shield and the second light shield can be reliably attached to the first and second gears disposed inside the cover member through the first opening and the second opening.

Since the first and second light shields located outside the cover member are attached to the first and second gears disposed inside the cover member through the openings of the cover member and the openings are closed by the light shields, the interior of the cover member disposed with the gears can be sealed, thereby further reliably restraining the adhesion of dust.

In addition, electronic components such as a sensor are sometimes attached to the board. Accordingly, an opening for exposing a part of the first and second gears may be formed on the board in order to attach the first and second light shields. However, the opening has to be formed at a position away from these electronic components, and the attachment positions of the first and second light shields are thus limited. In contrast, since the first and second openings are formed on the cover member, it is not necessary to form the first and second openings at a position away from the electronic components and the attachment positions of the first and second light shields can be more freely determined.

In the light adjuster according to the first aspect of the invention, it is preferable that the movement mechanism includes an intermediate gear meshing with the pinion gear and the first gear, the intermediate gear is an anti-backlash gear including: a first intermediate gear meshing with the pinion gear; a second intermediate gear meshing with the pinion gear to be coaxially rotated with the first intermediate gear; a biasing member configured to bias the first intermediate gear and the second intermediate gear; and a third intermediate gear configured to be coaxially rotated with the second intermediate gear and meshing with the first gear.

According to the above arrangement, the rotation of the pinion gear is transmitted to the first gear via the intermediate gear. Accordingly, as compared to an instance in which the pinion gear is directly meshed with the first gear, a reduction ratio of the first gear with respect to the pinion gear can be more easily adjusted.

In addition, since the intermediate gear in the above arrangement is an anti-backlash gear, a sound generated when the pinion gear meshes with the intermediate gear can be reduced. Thus, the drive sound of the light adjuster can be more reduced. Further, since a shaky movement of the intermediate gear can be reduced, a positional accuracy of the first light shield and the second light shield can be improved.

In the light adjuster according to the first aspect of the invention, it is preferable that the first light shield includes: a first attachment portion attached to the first gear; and a first heat release portion provided to the first attachment portion, and the second light shield includes: a second attachment portion attached to the second gear; and a second heat release portion provided to the second attachment portion.

According to the above arrangement, since the heat generated by the incident light on the first and second light shields can be radiated by the first and second heat radiators, deterioration of the light shields can be restrained.

Further, since the heat of the light shields is less likely to be transferred to the first and second gears, the thermal expansion of the first and second gears can be restrained. Thus, the rotation of the first and second gears is less likely to be hindered. Accordingly, the reliability of the light adjuster can be further improved.

In addition, unintended shielding of the light passing through the light adjuster by the heat radiators is less likely to occur.

In the light adjuster according to the first aspect of the invention, it is preferable that the first heat release portion includes a plurality of first fins extending from the first attachment portion, the second heat release portion includes a plurality of second fins extending from the second attachment portion, and the plurality of first fins and the plurality of second fins extend in a direction intersecting a flow direction of a cooling wind flowing along the first light shield and the second light shield.

According to the above arrangement, as compared with an instance in which the first fin and the second fin extend along the flow direction of the cooling wind, the cooling wind more easily collides against the fins. Accordingly, the heat can be more efficiently radiated into the air by the heat radiators, thereby further restraining the thermal expansion of the first and second gears.

A projector according to a second aspect of the invention includes: a light source; an optical modulator configured to modulate a light beam emitted from the light source; a projection optical device configured to project the light beam modulated by the optical modulator; and the above-described light adjuster disposed in an optical path of the light beam emitted from the light source to be incident on the optical modulator.

The same advantages as those of the light adjuster according to the first aspect of the invention can be obtained according to the above second aspect of the invention. In addition, since the first and second light shields are disposed in an optical path of the light beam emitted from the light source to be incident on the optical modulator, the quantity of the light to be incident on the optical modulator can be reliably adjusted. Thus, a contrast of the image formed by the optical modulator and, consequently, the image projected by the projection optical device, can be improved.

BRIEF DESCRIPTION OF THE DRAWING(S)

FIG. 1 is a perspective view showing an exterior of a projector according to an exemplary embodiment.

FIG. 2 schematically illustrates an arrangement of the projector according to the exemplary embodiment.

Figure 7:
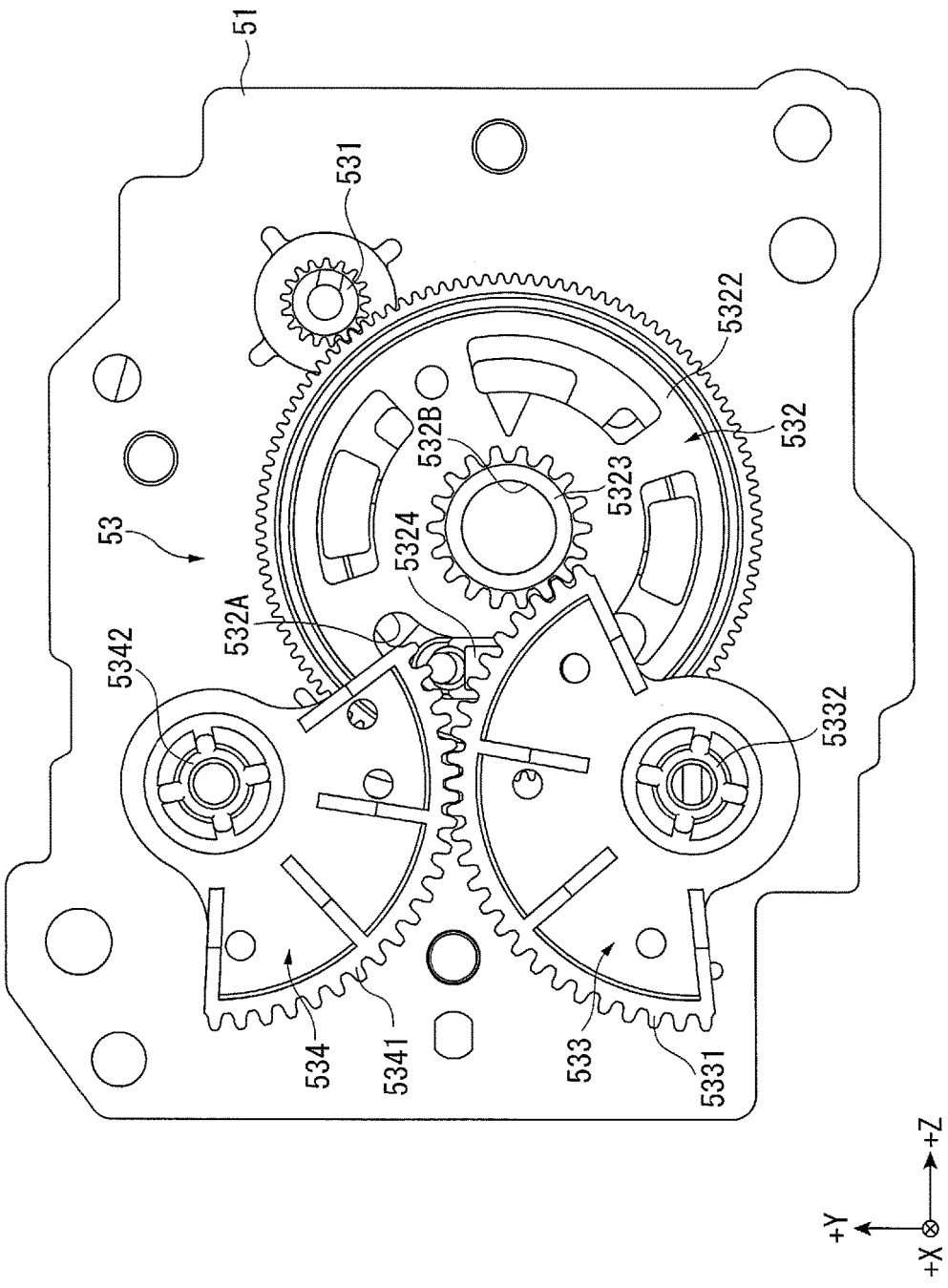

FIG. 7 schematically illustrates an arrangement of a movement mechanism according to the exemplary embodiment.

Figure 8:
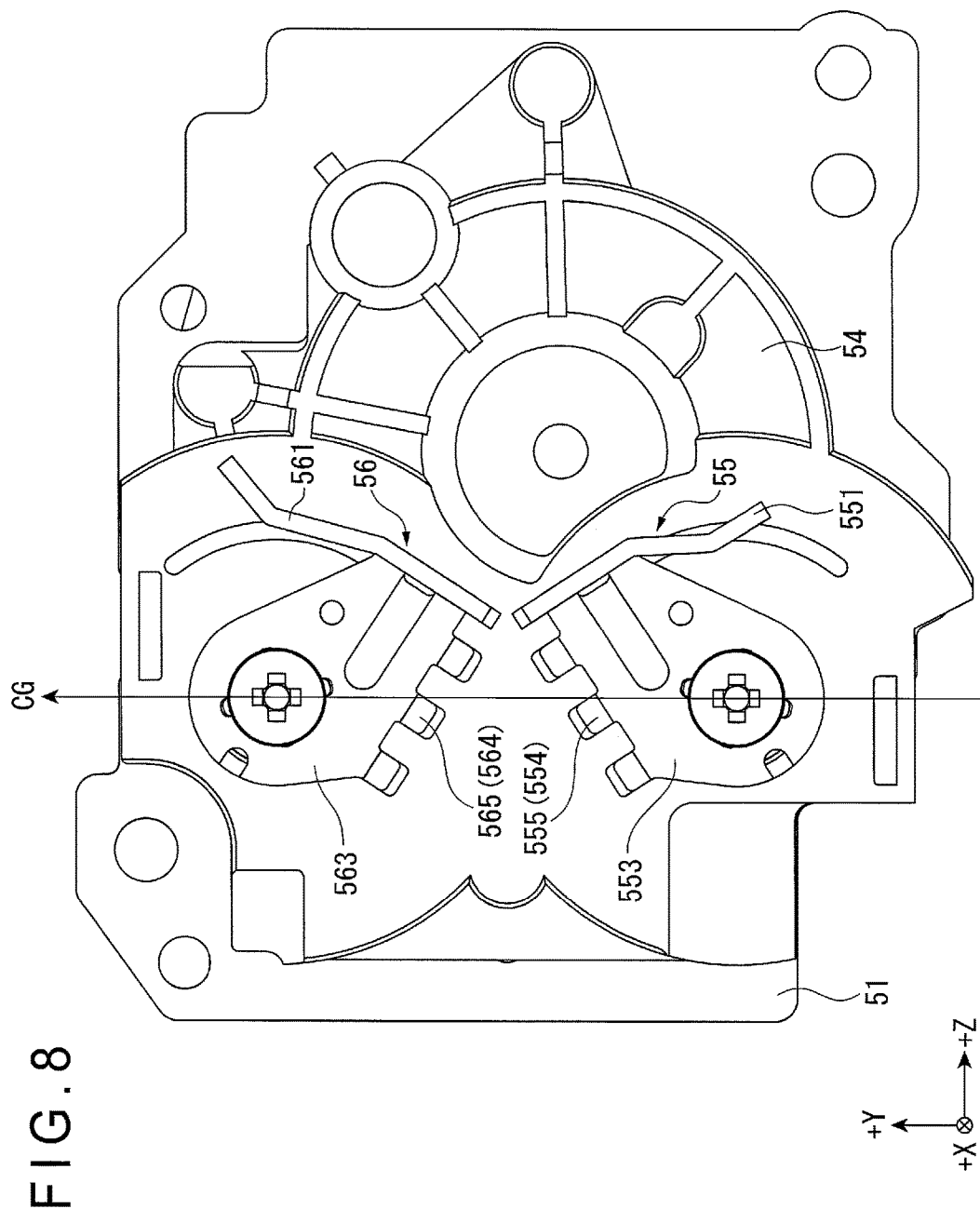

FIG. 8 illustrates the light adjuster according to the exemplary embodiment.

Figure 9:
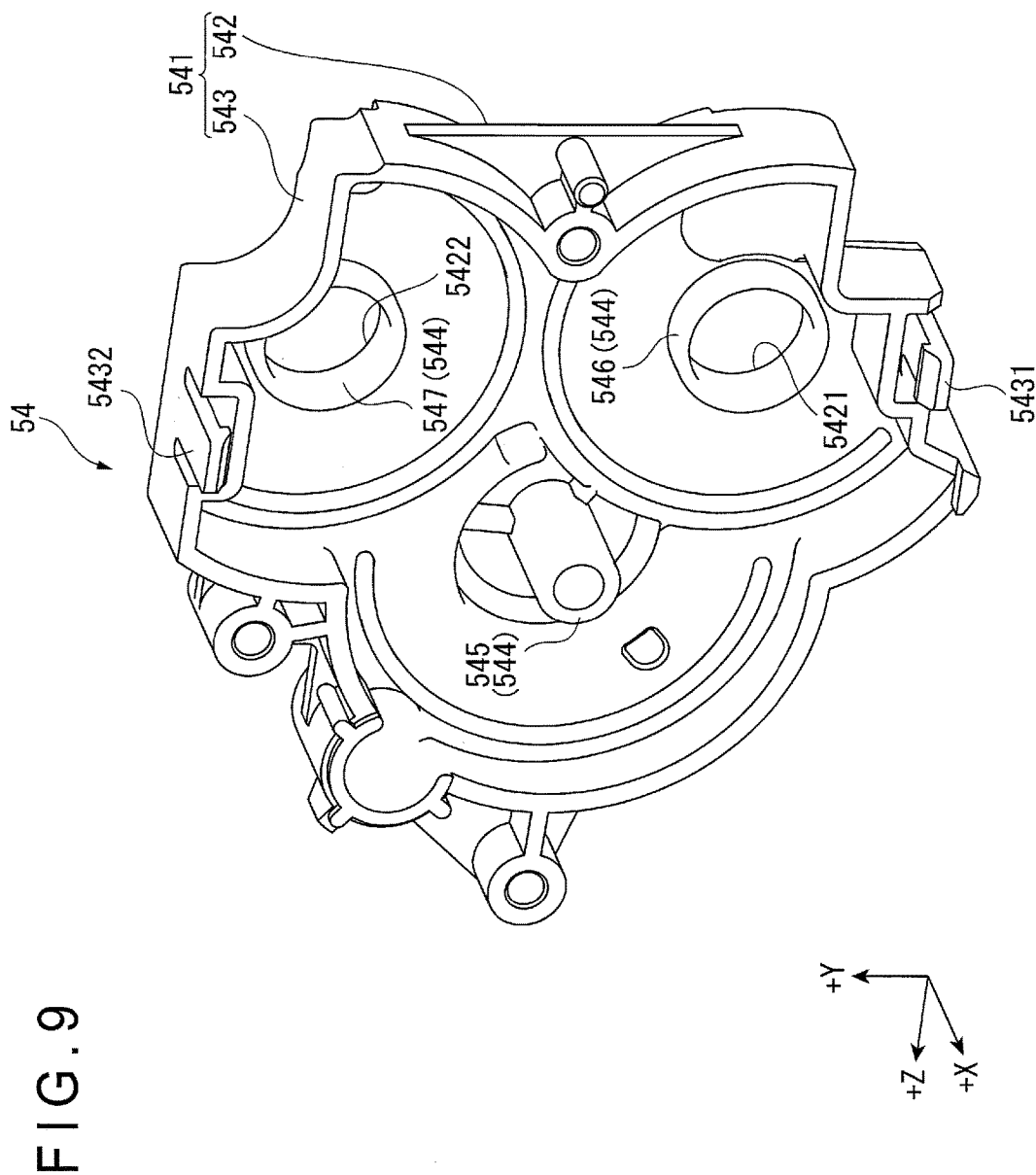

FIG. 9 is a perspective view showing a cover member according to the exemplary embodiment.

DESCRIPTION EXEMPLARY OF EMBODIMENT(S)

Figure 1:
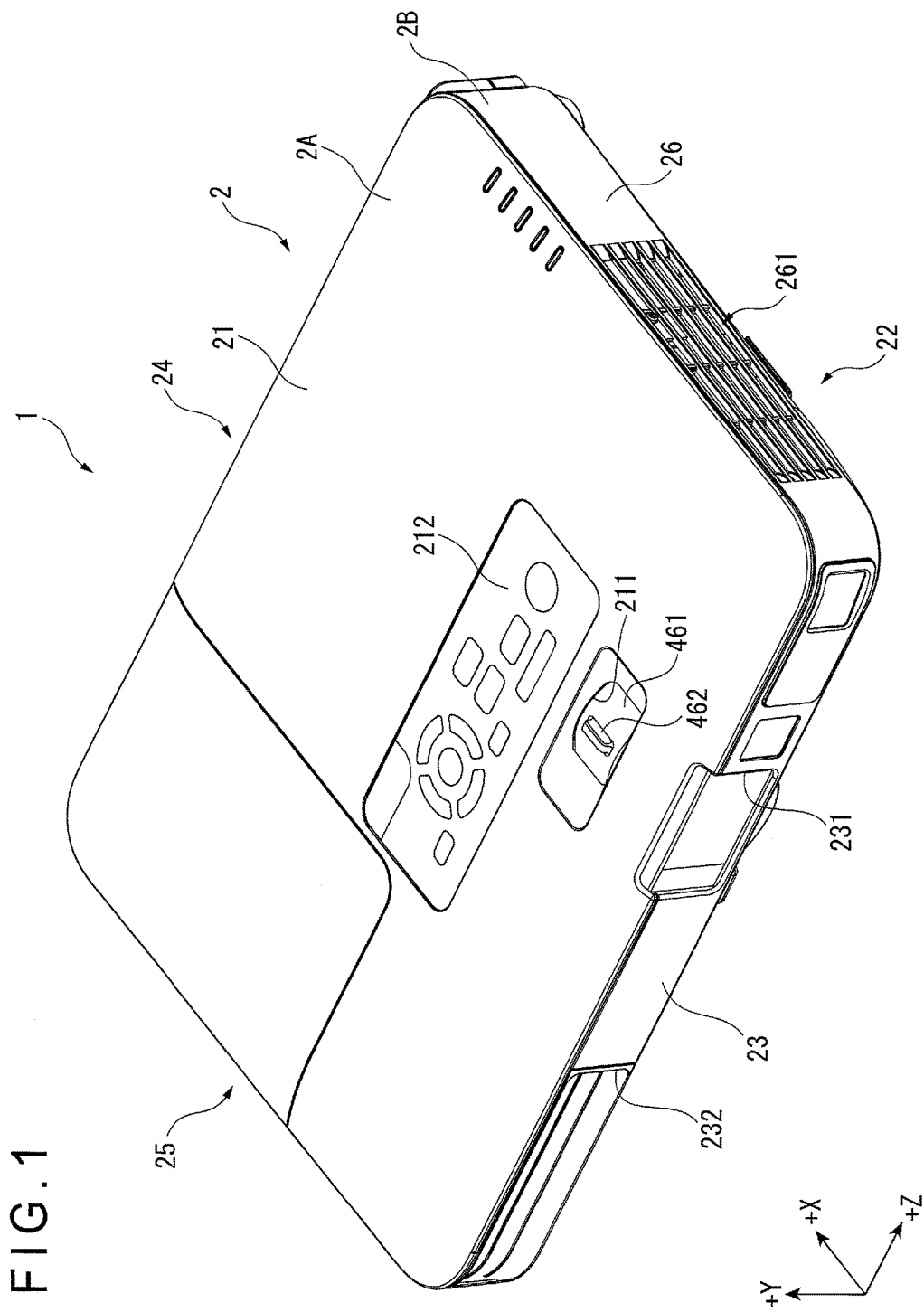

An exemplary embodiment will be described below.
Exterior Arrangement of Projector FIG. 1 is a perspective view showing a projector 1 according to the exemplary embodiment seen from an upper front side thereof.

The projector 1 according to the exemplary embodiment is an image display device configured to modulate a light emitted from a light source disposed inside the projector 1 to form an image corresponding to image information, and to enlarge and project the image on a projection surface such as a screen. As shown in FIG. 1, the projector 1 includes an exterior case 2 and a device body 3 (see FIG. 2) disposed inside the exterior case 2.

Though detailed later, the projector 1 includes a light adjuster 5 (see FIGS. 3 to 6). The light adjuster 5 includes has a unique feature that a combination of a board and a cover member, which is configured to support a part of a movement mechanism configured to move a pair of light shields by a driving force thereof, are combined to define a space where gears of the movement mechanism are housed.

The arrangement of the projector 1 will be detailed below.
Arrangement of Exterior Case The exterior case 2 is a substantially rectangular parallelepiped component, which is made of a synthetic resin in the exemplary embodiment. The exterior case 2 is defined by a combination of an upper case 2A and a lower case 2B. The exterior case 2 includes a top portion 21, a bottom portion 22, a front portion 23, a rear portion 24, a left side portion 25 and a right side portion 26.

The top portion 21 includes an opening 211 for exposing a control lever 462 provided to a projection optical device 46 (described later). The control lever 462 is a lever for focus adjustment or zoom adjustment of the image projected by the projection optical device 46. Further, the top portion 21 includes a control panel 212 through which various operations on the projector 1 are inputted.

An intake 261 through which external air is introduced into an inside of the exterior case 2 as a cooling air is provided on the right side portion 26.

The front portion 23 is provided with an opening 231 and an outlet 232. The opening 231 is located substantially at the center of the front portion 23 and configured to let the image projected by the projection optical device 46 pass therethrough. The outlet 232 is located on the front portion 23 near the left side portion 25. The cooling air having flowed inside the exterior case 2 is discharged through the outlet 232.

Arrangement of Device Body

Figure 2:
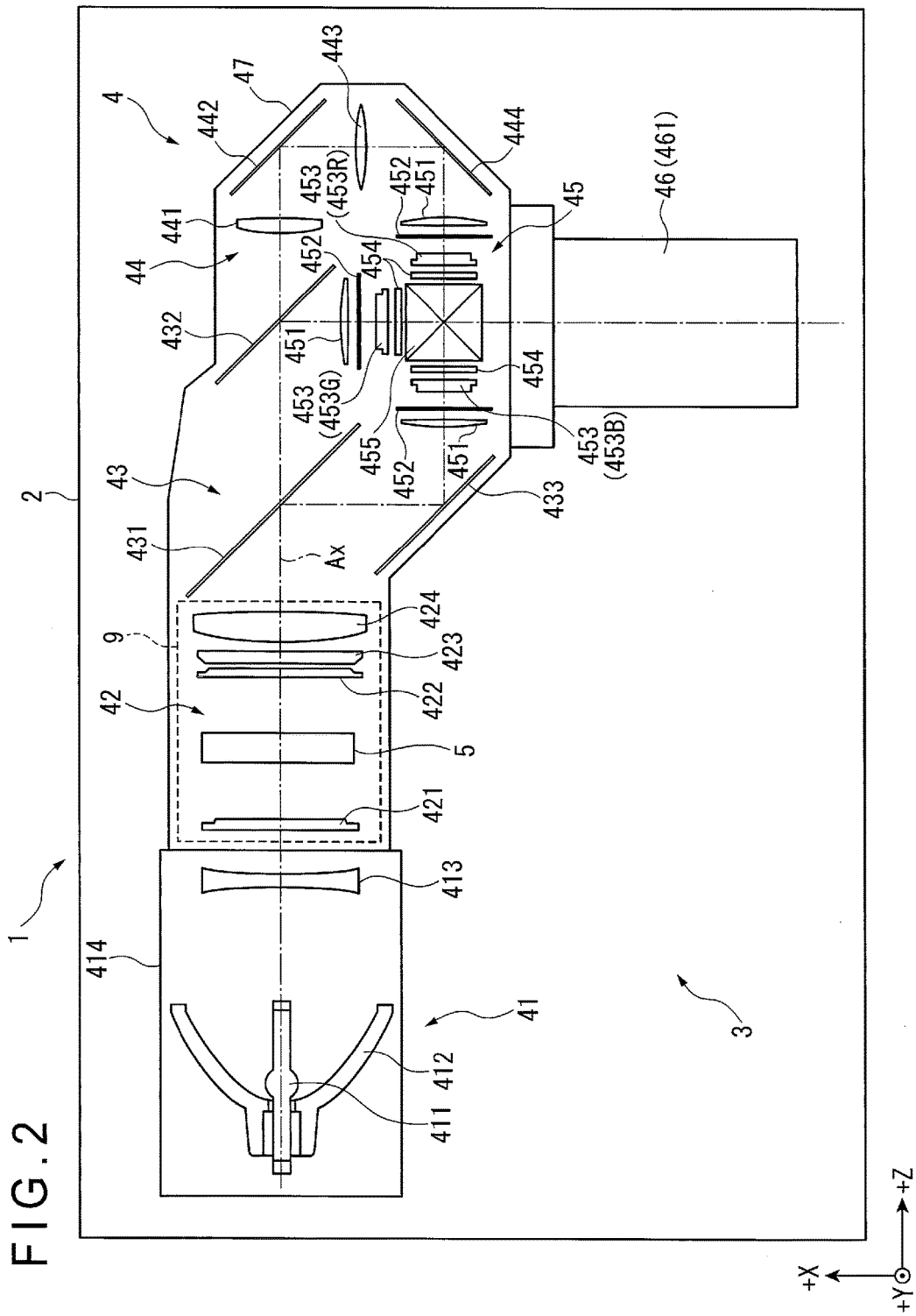

FIG. 2 is an illustration schematically showing an arrangement of the device body.

The device body 3 defines an interior structure of the projector 1 and is disposed inside the exterior case 2. As shown in FIG. 2, the device body 3 includes an image projection device 4 and a cooling device 9. In addition, though not illustrated, the device body 3 includes a control device configured to control the projector 1 and a power source configured to supply electric power to electronic components of the projector 1.

Though not illustrated in detail, the cooling device 9 includes a cooling fan and a duct configured to guide a cooling wind delivered by the cooling fan to a lower side of the later-described light adjuster 5.

The image projection device 4 is configured to form and project the image in accordance with the image information under the control of the control device. As shown in FIG. 2, the image projection device 4 includes a light source 41, an equalizer 42, a color separator 43, a relay device 44, an electrooptic device 45, a projection optical device 46 and an optical component case 47.

The light source 41 is configured to emit a light beam to the equalizer 42. The light source 41 includes a light source lamp 411, a reflector 412, a collimating lens 413, and a housing 414 that houses the light source lamp 411, the reflector 412 and the collimating lens 413. However, the light source 41 may include a solid light source such as an LED (Light Emitting Diode) and LD (Laser Diode). Further, the light source 41 may include the solid light source and a wavelength converter configured to convert a wavelength of at least a part of the light emitted from the solid light source. Further, two or more of the light sources may be provided.

The equalizer 42 is configured to equalize illuminance in a plane orthogonal to a central axis of the light beam received from the light source 41. The equalizer 42 includes, in an order for the light beam from the light source 41 to be incident, a first lens array 421, a light adjuster 5, a second lens array 422, a polarization converter 423 and a condenser lens 424. It should be noted that the light adjuster 5 will be detailed below.

The color separator 43 separates the light beam received from the equalizer 42 into three color lights of red (R), green (G) and blue (B). The color separator 43 includes dichroic mirrors 431, 432 and a reflection mirror 433.

The relay device 44 is disposed in an optical path of the red color light having a longer optical path length than those of the other two of the separated three color lights.

The relay device 44 includes an incident-side lens 441, a relay lens 443 and reflection mirrors 442, 444.

The electrooptic device 45 is configured to modulate each of the separated color lights in accordance with the image information and, subsequently, combine the color lights to form an image light projected by the projection optical device 46. The electrooptic device 45 includes: components for the individual color lights including three field lenses 451, three incident-side polarization plates 452, three optical modulators in a form of liquid crystal panels 453 (the liquid crystal panels for red, green and blue are respectively referred to as a liquid crystal panel 453R, a liquid crystal panel 453G and a liquid crystal panel 453B), and three exit-side polarization plates 454; and a color combiner 455. Among the above, the color combiner 455 is configured to combine the modulated color lights and is in a form of a cross dichroic prism in the exemplary embodiment. It should be noted, however, that the color combiner 455 may alternatively be formed from a plurality of dichroic mirrors.

The projection optical device 46 is configured to enlarge and project the image light formed by the electrooptic device 45 on the projection surface. The projection optical device 46 is a lens set including a plurality of lenses (not shown), and a lens barrel 461 housing the plurality of lenses. Among the above, the control lever 462 (see FIG. 1) is provided on an outer circumferential surface of the lens barrel 461.

The optical component case 47 is configured to support a part of the optical components of the devices 41 to 46. An illumination optical axis Ax is defined in the optical component case 47. The devices 41-46 are disposed at predetermined positions on the illumination optical axis Ax. For instance, when the light source 41 is connected to the optical component case 47, the central axis of the light beam emitted from the light source 41 coincides with the illumination optical axis Ax.

Arrangement of Light Adjuster

The arrangement of the light adjuster 5 will be detailed below.

Incidentally, it is assumed in the description below that +X-direction, +Y-direction and +Z-direction are mutually orthogonal and the light incident on the light adjuster 5 advances in the +Z-direction. Further, the +Y-direction is defined as a direction from the bottom portion 22 to the top portion 21, and the +X-direction is defined as a direction from the left to the right when the light adjuster 5 is seen in the +Z-direction with a +Y-direction side of the light adjuster facing upward. In other words, the +Z-direction is a direction from the left side portion 25 to the right side portion 26, the +Y-direction is a direction from the bottom portion 22 to the top portion 21, and the +X-direction is a direction from the front portion 23 to the rear portion 24. Further, a direction opposite the +Z-direction is defined as −Z-direction. −X-direction and −Y-direction are similarly defined.

Figure 3:
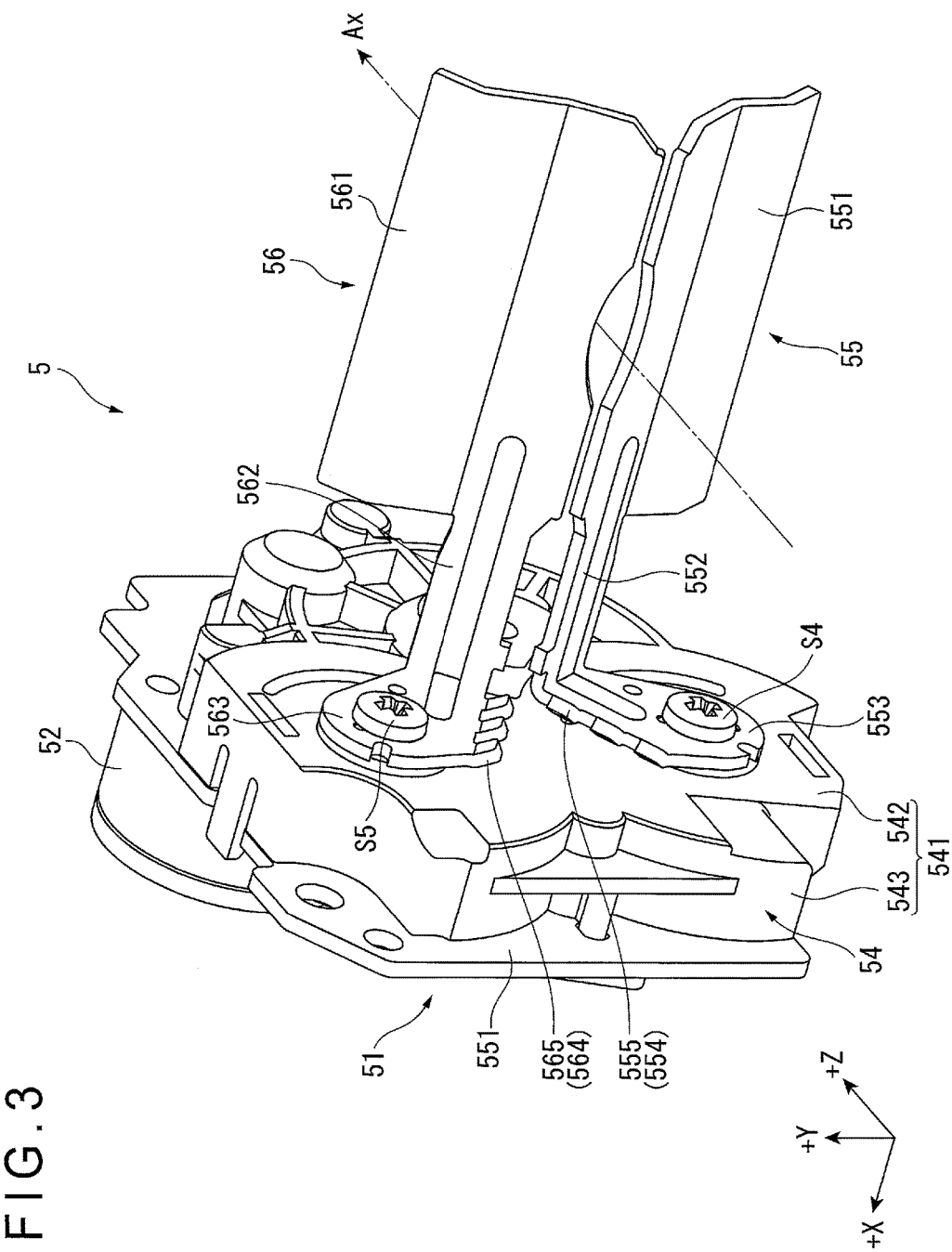
FIG. 3 is a perspective view showing a light adjuster according to the exemplary embodiment.
Figure 4:
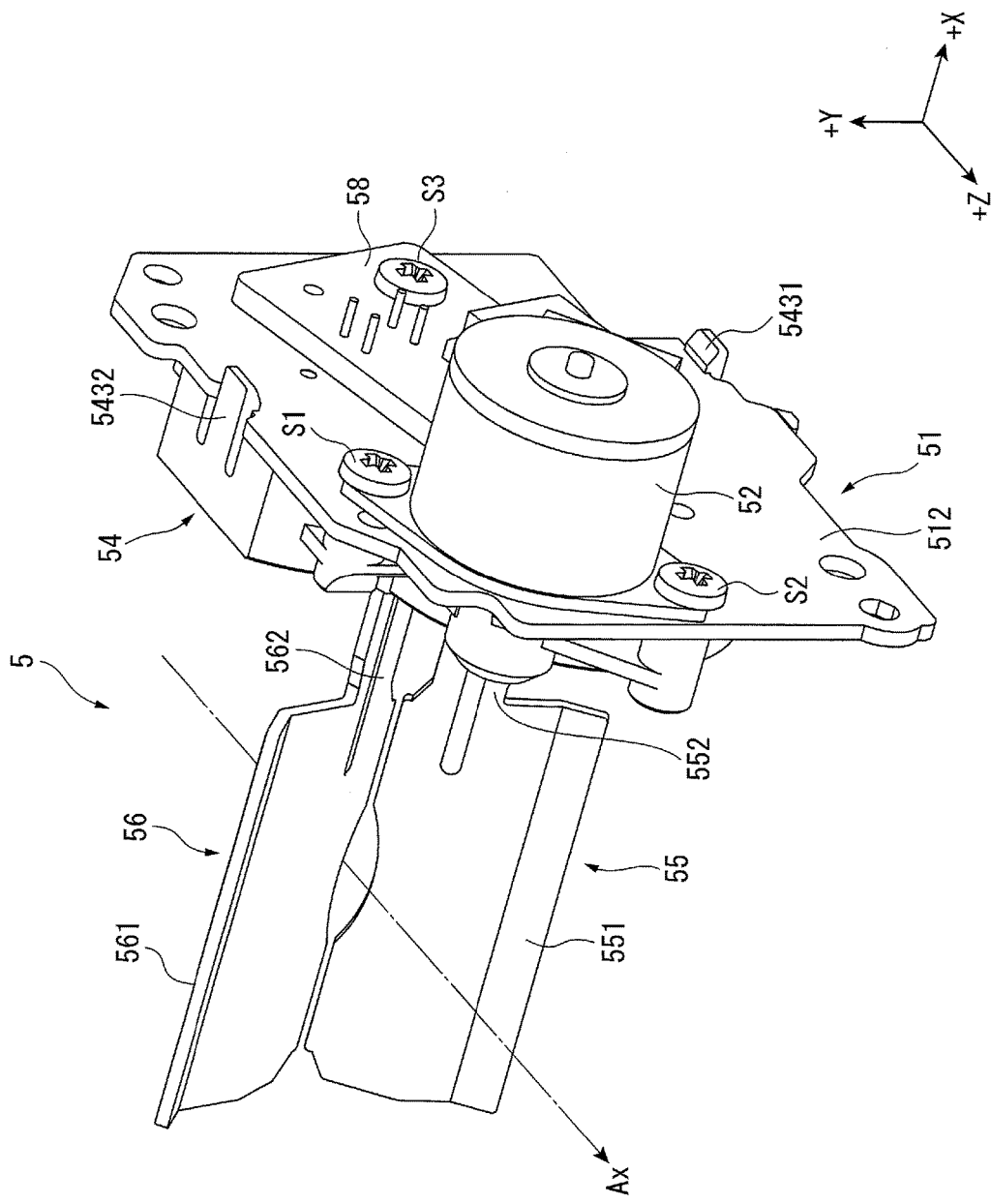
FIG. 4 is another perspective view showing the light adjuster according to the exemplary embodiment.
Figure 5:
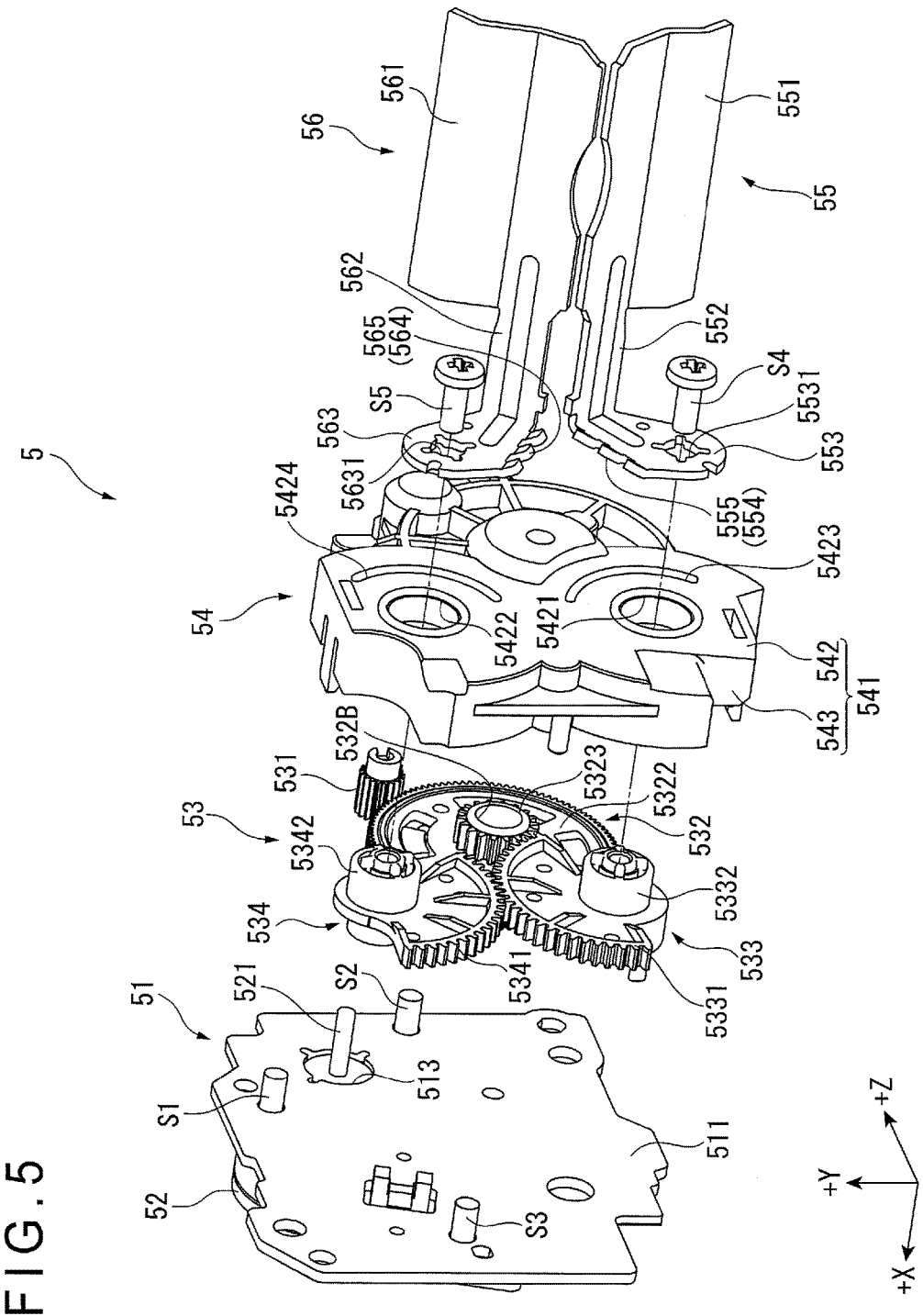
FIG. 5 is an exploded perspective view showing the light adjuster according to the exemplary embodiment.
Figure 6:
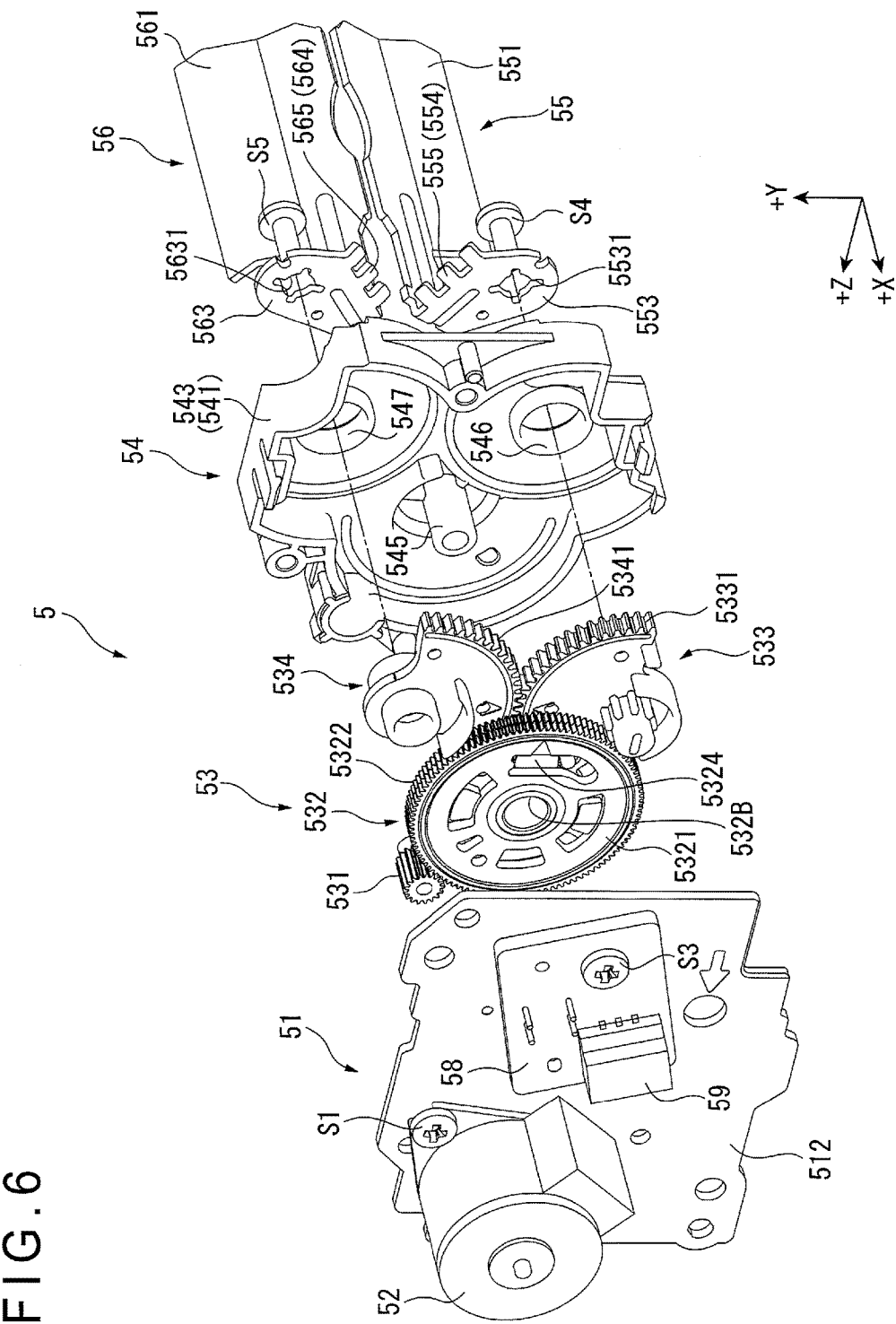
FIG. 6 is another exploded perspective view showing the light adjuster according to the exemplary embodiment.

FIGS. 3 to 6 show the light adjuster 5 whose light shields 55, 56 are fully closed (i.e. with the maximum shielded light quantity). Specifically, FIG. 3 is a perspective view showing the light adjuster 5 as seen from the −Z-direction side. FIG. 4 is a perspective view showing the light adjuster 5 as seen from the +Z-direction side. Further, FIG. 5 is an exploded perspective view showing the light adjuster 5 as seen from the −Z-direction side. FIG. 6 is an exploded perspective view showing the light adjuster 5 as seen from the +Z-direction side.

The light adjuster 5 is configured to shield at least a part of the light passing through the first lens array 421 to be incident on the second lens array 422 to adjust the light quantity of the light incident on the liquid crystal panel 453. In other words, the light adjuster 5 is configured to adjust passing light quantity of the incident light beam. As shown in FIGS. 3 to 6, the light adjuster 5 includes a base 51 (board), a motor 52 (drive section), a movement mechanism 53, a cover member 54, a light shield 55 (first light shield), a light shield 56 (second light shield), a wiring board 58 and a sensor 59.

Arrangement of Base

The base 51 is configured to support the motor 52, the cover member 54 and the wiring board 58. The base 51 is attached to the optical component case 47 using a fixture such as a screw. As shown in FIGS. 5 and 6, the base 51 includes a front side 511 facing in the −X-direction, a rear side 512 in the +X-direction, and a through hole 513.

The cover member 54 is attached to the front side 511.

The wiring board 58 is attached to the rear side 512 using a screw S3. The sensor 59 is installed on a +X-direction side of the wiring board 58.

The through hole 513 is configured to receive a spindle 521 of the motor 52.

Arrangement of Motor

The motor 52 is configured to be driven in response to a drive signal inputted through a cable (not shown) by the control device to generate a driving force for moving the light shields 55, 56 via the movement mechanism 53. In the exemplary embodiment, the motor 52 is in a form of a stepping motor. As shown in FIG. 5, the motor 52 includes the spindle 521 configured to be rotated around a rotation axis along the +X-direction. The motor 52 is attached to the rear side 512 of the base 51 using screws S1, S2 with the spindle 521 received through the through hole 513.

Arrangement of Movement Mechanism

FIG. 7 shows the movement mechanism 53 as seen from the −X-direction side.

The movement mechanism 53 is configured to move the light shields 55, 56 using the driving force generated by the motor 52. As shown in FIGS. 5 to 7, the movement mechanism 53 includes a pinion gear 531 (spur gear) rotated around an axis extending along the +X-direction, and three gears 532 to 534. The gears 531 to 534 are made of a resin material.

Among the above, the pinion gear 531 is attached to the spindle 521 of the motor 52 and is rotated together with the spindle 521.

The gear 532 corresponds to an intermediate gear of the invention and is in a form of an anti-backlash gear. The gear 532 includes a first intermediate gear 5321 and a second intermediate gear 5322 each meshing with the pinion gear 531, a third intermediate gear 5323, and a biasing member 5324 (see FIGS. 6 and 7).

The first intermediate gear 5321 and the second intermediate gear 5322 are circular gears having the same diameter and configured to be rotated around the same rotary axis. A plurality of teeth formed on outer circumferential surfaces of the intermediate gears 5321, 5322 to be meshed with the pinion gear 531 have the same pitch. The first intermediate gear 5321 is located at a +X-direction side of the second intermediate gear 5322.

The first intermediate gear 5321 and the second intermediate gear 5322 have a common insertion hole 532B for receiving a rotary shaft 545 of the cover member 54 (described later). The rotary shaft 545 is inserted into the insertion hole 532B, so that the intermediate gears 5321, 5322 are rotatably supported by the rotary shaft 545.

The third intermediate gear 5323 is a circular gear integrally provided on a face of the second intermediate gear 5322 opposite the first intermediate gear 5321. The common insertion hole 532B extending through the first intermediate gear 5321 and the second intermediate gear 5322 also extends through the third intermediate gear 5323, and the rotary shaft 545 of the cover member 54 is inserted into the insertion hole 532B. The third intermediate gear 5323 rotates in the same direction as those of the first intermediate gear 5321 and the second intermediate gear 5322 in conjunction with the rotation of the pinion gear 531. The outer diameter of the third intermediate gear 5323 is smaller than the outer diameter of the second intermediate gear 5322. The third intermediate gear 5323 includes on the outer circumferential surface thereof a plurality of teeth having a pitch larger than the pitch of the plurality of teeth formed on the outer circumferential surface of the second intermediate gear 5322. The plurality of gears of the third intermediate gear 5323 mesh with the gear 533.

The biasing member 5324 is made from a spring and housed in a housing portion 532A defined in the intermediate gears 5321, 5322. One end of the biasing member 5324 is fixed on the first intermediate gear 5321 and the other end of the biasing member 5324 is fixed on the second intermediate gear 5322. Thus, the intermediate gears 5321, 5322 are biased so that a point of the first intermediate gear 5321 in a rotation direction of the intermediate gears 5321, 5322 and a point of the second intermediate gear 5322 in the rotation direction of the intermediate gears 5321, 5322 approach each other. In other words, the first intermediate gear 5321 is biased in a first rotation direction of the gear 532 and the second intermediate gear 5322 is biased in a second rotation direction of the gear 532 opposite the first rotation direction. A scissors mechanism for holding the teeth of the pinion gear 531 with the teeth of the intermediate gear 5321, 5322 can be formed by the above arrangement, thereby reducing the influence of backlash between the pinion gear 531 and the gear 532.

The gear 533 corresponds to a first gear of the invention. The gear 533 is a sector-shaped member seen in the —X-direction. The gear 533 includes a gear section 5331 and a shaft 5332.

The gear section 5331 is defined by a plurality of gears formed on an arc portion of the sector shape. The gear section 5331 meshes with the third intermediate gear 5323.

The shaft 5332 projects from the gear 533 in the —X-direction (i.e. in a direction opposite the base 51). Though detailed below, the shaft 5332 is inserted into a bearing 546 of the cover member 54 to define a rotation center of the gear 533. Further, the shaft 5332 is exposed to an outside through an opening 5421 of the cover member 54. The light shield 55 is fixed to the shaft 5332.

The gear 534 corresponds to a second gear of the invention. The gear 534 has a sector shape smaller than the gear 533 seen in the —X-direction and meshes with the gear 533. The gear 534 includes a gear section 5341 and a shaft 5342.

The gear section 5341 is defined by a plurality of gears formed on an arc portion of the sector shape. The gear section 5341 meshes with the gear section 5331 of the gear 533.

The shaft 5342 projects from the gear 534 in the —X-direction (i.e. in a direction opposite the base 51). Though detailed later, the shaft 5342 is inserted into a bearing 547 of the cover member 54 to define a rotation center of the gear 534. Further, the shaft 5342 is exposed to an outside through an opening 5422 of the cover member 54. The light shield 56 is fixed to the shaft 5342.

In the movement mechanism 53, when the motor 52 is driven to rotate the pinion gear 531 anticlockwise as seen from the —X-direction side, the gear 533 rotates anticlockwise via the gear 532 and the gear 534 rotates clockwise in conjunction with the rotation of the gear 532, as shown in FIG. 7. The rotations of the gears 533 and 534 cause movements of the light shields 55, 56 attached to the gears 533, 534 in directions approaching each other.

On the other hand, when the pinion gear 531 is rotated clockwise as seen in the —X-direction, the gear 533 rotates clockwise via the gear 532 and the gear 534 rotates anticlockwise in conjunction with the rotation of the gear 532. The rotations of the gears 533 and 534 cause movements of the light shields 55, 56 in directions away from each other.

Arrangement of Cover Member

FIG. 8 shows the cover member 54 and the light shields 55, 56 as seen from the −X-direction side. FIG. 9 is a perspective view showing the cover member 54 as seen from the +X-direction side.

The cover member 54 is a component made of resin and is attached to the base 51 to cover the movement mechanism 53. The cover member 54 is configured to restrain dusts from adhering to the gears 531 to 534 of the movement mechanism 53 and block the noise generated when the gears 531 to 534 are rotated.

As shown in FIG. 9, the cover member 54 includes a body portion 541 and a support portion 544.

As shown in FIGS. 5, 6 and 9, the body portion 541 includes a planar portion 542 and a side portion 543.

The planar portion 542 is a flat face of the cover member 54 extending along a Y-Z plane. The planar portion 542 includes the opening 5421 (first opening) and the opening 5422 (second opening) for exposing the shafts 5332, 5342 of the gear 533, 534, and projections 5423, 5424 projecting in the −X-direction as shown in FIG. 5.

Among the above, the projection 5423 is formed on a −X-direction side of the cover member 54 along an arc of a circle concentric with the opening 5421. A +X-direction side of a later-described attachment portion 553 of the light shield 55 is in contact with the projection 5423 to reduce a slide resistance of the light shield 55.

Similarly, the projection 5424 is formed on the −X-direction side of the cover member 54 along an arc of a circle concentric with the opening 5422. A +X-direction side of a later-described attachment portion 563 of the light shield 56 is in contact with the projection 5424 to reduce a slide resistance of the light shield 56.

The side portion 543 extends in the +X-direction from an outer peripheral edge of the planar portion 542. As shown in FIG. 9, the side portion 543 includes a pair of claws 5431, 5432 (locking portions) that are hooked with an outer peripheral edge of the base 51 to lock the cover member 54 to the base 51.

The planar portion 542 and the side portion 543 define a recess facing in the +X-direction inside the body portion 541. The movement mechanism 53 is housed in a space surrounded by the front side 511 of the base 51 and the cover member 54.

The support portion 544 supports the gears 532 to 534 in a rotatable manner. The support portion 544 includes the rotary shaft 545 and the bearings 546, 547.

The rotary shaft 545 projects from the planar portion 542 in the +X-direction to be inserted into the gear 532, as described above. Thus, the gear 532 is rotatably supported around the rotary shaft 545.

The bearing 546 is a cylindrical portion projecting from an outer peripheral edge of the opening 5421 of the planar portion 542 in the +X-direction. The shaft 5332 is inserted into the bearing 546 so that the gear 533 is supported in a manner rotatable around the shaft 5332.

Similarly to the bearing 546, the bearing 547 is a cylindrical portion projecting from an outer peripheral edge of the opening 5422 of the planar portion 542 in the +X-direction. The shaft 5342 is inserted into the bearing 547 so that the gear 534 is supported in a manner rotatable around the shaft 5342.

Arrangement of Light Shield

The light shield 55 (first light shield) and the light shield 56 (second light shield) shown in FIGS. 3 to 6 are each a component formed by bending a metal plate. The light shields 55, 56 are each disposed at the +Y-direction side and −Y-direction side of the central axis of the light beam emitted from the light source 41 to be incident on the second lens array 422 through the first lens array 421 (the same as the above illumination optical axis Ax). The light shields 55, 56 are moved by the movement mechanism 53 into a passage area of the light beam to shield at least a part of the light beam to adjust a passing light quantity of the light beam. It should be noted that, though the first lens array 421 separates the light beam emitted by the light source 41 into a plurality of partial light beams, the illumination optical axis Ax is defined by a central axis of the entirety of the plurality of partial light beams for the convenience of the explanation.

The light shield 55 includes a body portion 551, an extension portion 552, the attachment portion 553 (first attachment portion) and a heat radiator 554 (first heat release portion).

The body portion 551 is a portion to be moved into the passage area and is configured substantially as a rectangle as seen from the +Z-direction side. In order to restrain a light reflected by the body portion 551 from returning to the light source 41, the body portion 551 is partially curved when seen from the +X-direction side.

The extension portion 552 extends in the +X-direction from an end of the body portion 551 in the +X-direction.

The attachment portion 553 is bent at an end of the extension portion 552 in the +X-direction to extend along the Y-Z plane and is attached to the shaft 5332. A hole 5531 for receiving a screw S4 for fixing the light shield 55 to the shaft 5332 is formed in the attachment portion 553.

The heat radiator 554 includes a plurality of fins 555 (first fin) unidirectionally projecting from an outer edge of the attachment portion 553. The fins 555 extend from the outer edge of the attachment portion 553 in a manner slanted in the —X-direction.

The light shield 56 is a component mirror-symmetric with the light shield 55. Specifically, the light shield 56 includes a body portion 561, an extension portion 562, the attachment portion 563 (second attachment portion) and a heat radiator 564 (second heat release portion), similarly to those of the light shield 55. The light shield 56 is attached to the shaft 5342 with a screw S5 received in a hole 5631 formed in the attachment portion 563 to be fixed to the shaft 5342.

It should be noted that the heat radiator 564 includes a plurality of fins 565 (second fin) unidirectionally projecting from an outer edge of the attachment portion 563, similarly to the heat radiator 554. The fins 565 also extend from the outer edge of the attachment portion 563 in a manner slanted in the −X-direction.

Light Quantity Adjustment by Light Shield

The body portions 551, 561 move toward (i.e. in a direction for the body portions to approach each other) and away from (i.e. in a direction for the body portions to go away from each other) the central axis of the light beam traveling from the first lens array 421 to the second lens array 422 in conjunction with the rotation of the gears 533, 534. The distances between the central axis and each of the body portions 551, 561 are adjusted by the movement to adjust the light quantity shielded by the body portions 551, 561, thereby adjusting the quantity of the light incident on the liquid crystal panel 453.

For instance, when the ends of the body portions 551, 561 near the central axis are furthest away from the central axis (fully open state: a state with the minimum shielded light quantity), the quantity of the light incident on the liquid crystal panel 453 is maximized. On the other hand, when the ends of the body portions 551, 561 near the central axis are closest to the central axis (fully closed state: a state with the maximum shielded light quantity), the quantity of the light incident on the liquid crystal panel 453 is minimized.

It should also be noted that the body portions 551, 561 in the exemplary embodiment are configured not to be overlapped when being seen from the −Z-direction even in the fully closed state, and a small quantity of light passes through the light adjuster 5 even in the fully closed state. It should be noted, however, that the light adjuster 5 may be configured so that the light to be incident on the second lens array 422 is completely shielded in the fully closed state.

Flow of Cooling Wind Flowing in Light Adjuster

A relationship between a flow direction of a cooling wind for cooling the light shields 55, 56 of the light adjuster 5 and a projection direction of the fins 555, 565 of the light shields 55, 56 will be described below.

As shown in FIG. 8, a cooling wind CG (a part of the cooling wind delivered by the cooling device 9 (see FIG. 2) and having reached the light adjuster 5) flows in the +Y-direction along the light shields 55, 56. Thus, the light shields 55, 56 heated by the incident light can be cooled.

As described above, the fins 555, 565 extend from the outer edges of the attachment portions 553, 563 in a manner slanted in the −X-direction. In other words, since the fins 555, 565 extend in a direction intersecting the flow direction of the cooling wind CG, the cooling wind CG is more likely to collide on the fins 555, 565.

Further, when seen from the −X-direction side, the fins 555, 565 are arranged in a direction intersecting the flow direction of the cooling wind CG in the fully closed state. In other words, the fins 555, 565 are arranged so as not to be overlapped in the flow direction of the cooling wind CG. According to the above arrangement, as compared to an instance in which, for instance, the fins 555, 565 are arranged along the flow direction of the cooling wind CG, the cooling wind CG is more likely to collide with the fins 555, 565. It should be noted that, in the exemplary embodiment, the light adjuster 5 is configured so that the arrangement direction of the fins 555, 565 always intersects with the flow direction of the cooling wind CG until the fully closed state shifts to the fully open state.

Thus, the heat transferred from the body portions 551, 561 to the attachment portions 553, 563 can be efficiently released from the fins 555, 565 into the air, thereby restraining the transfer of the heat from the attachment portions 553, 563 to the gears 533, 534. In addition, the cooling efficiency of the light shields 55, 56 can be enhanced, thereby efficiently restraining the light shields 55, 56 from being deteriorated.

Advantage(s) of Exemplary Embodiment(s)

According to the projector 1 of the exemplary embodiment, following advantages can be obtained.

Since the gears 531 to 534 are covered with the base 51 and the cover member 54, adhesion of dust onto the gears 531 to 534 can be reduced. Accordingly, the movement of the light shields 55, 56 can be kept from being hindered and the reliability of the light adjuster 5 can be improved. Since the noise generated when the gears 531 to 534 are rotated can be blocked by the cover member 54, the sound from the light adjuster 5 can be reduced. Since the light from the first lens array 421 can be shielded by the cover member 54, the light can be kept from being incident on the gears 531 to 534. Thus, degradation of the gears 531 to 534 can be restrained, and the movement of the movement mechanism 53 is less likely to be hindered by a thermal expansion of the gears 531 to 534 due to light incident on the gears 531 to 534.

The gears 532 to 534 are supported by the cover member 54. Accordingly, since the cover member 54 and the gears 532 to 534, which are supported by the cover member 54, can be attached at one time to the base 51 during the manufacture of the light adjuster 5, assemblability of the components can be improved.

Since the gears 532 to 534 are rotatably supported by the support portion 544 of the cover member 54, the gears 532 to 534 can be reliably supported by the cover member 54.

The light shields 55, 56 can be reliably attached to the gears 533, 534 disposed inside the cover member 54 through the openings 5421, 5422.

Since the light shields 55, 56 located outside the cover member 54 are attached to the gears 533, 534 disposed inside the cover member 54 through the openings 5421, 5422 of the cover member 54 and the openings 5421, 5422 are closed by the light shields 55, 56, the interior of the cover member 54 disposed with the gears 533, 534 can be sealed, thereby further reliably restraining the adhesion of dust.

The electronic components such as the motor 52, the wiring board 58 and the sensor 59 are attached to the base 51. Accordingly, if an opening for exposing a part of the gears 533, 534 is to be formed on the base 51 in order to attach the light shields 55, 56, the opening has to be formed at a position away from these electronic components, and the attachment positions of the light shields 55, 56 are limited. In contrast, since the openings 5421, 5422 of the projector 1 are formed on the cover member 54, it is not necessary to form the openings 5421, 5422 at a position away from the electronic components and the attachment position of the light shields 55, 56 can be determined with an improved flexibility.

The rotation of the pinion gear 531 is transmitted to the gear 533 via the gear 532. Accordingly, as compared to an instance in which the pinion gear 531 is directly meshed with the gear 533, a reduction ratio of the gear 533 with respect to the pinion gear 531 can be more easily adjusted.

Since the gear 532 is an anti-backlash gear, a sound (tooth hitting sound) generated when the pinion gear 531 meshes with the gear 532 can be reduced. Thus, the drive sound of the light adjuster 5 can be more reduced. Since the tooth hitting sound generated between the pinion gear 531 and the gear meshing with the pinion gear 531 is larger than tooth hitting sound between other gears, the use of the anti-backlash gear as the gear 532 meshing with the pinion gear 531 effectively reduces the drive sound.

Further, since the gear 532 is an anti-backlash gear, shaky movement of the gear 532 can be restrained, thereby improving position accuracy of the light shields 55, 56.

The light shields 55, 56 include the heat radiators 554, 564 provided on the attachment portions 553, 563. Since the heat generated by the light incident on the light shields 55, 56 can be released by the heat radiators 554, 564, the deterioration of the light shields 55, 56 can be restrained. Further, since the heat of the light shields 55, 56 is less likely to be transferred to the gears 533, 534, the thermal expansion of the gears 533, 534 can be restrained. Thus, the rotation of the gears 533, 534 can be restrained from being hindered. Accordingly, the reliability of the light adjuster 5 can be further improved. In addition, unintended shielding of the light passing through the light adjuster 5 by the heat radiators 554, 564 is less likely to occur.

Since the fins 555, 565 extend in a direction intersecting the flow direction of the cooling wind CG, the cooling wind CG is more likely to collide on the fins 555, 565 as compared with an instance in which the fins 555, 565 extend along the flow direction of the cooling wind CG. Accordingly, the heat can be more efficiently released into the air by the heat radiators 554, 564, thereby further restraining the thermal expansion of the gears 533, 534.

Since the light shields 55, 56 are disposed in an optical path of the light beam emitted from the light source 41 to be incident on the liquid crystal panel 453, the quantity of the light to be incident on the liquid crystal panel 453 can be reliably adjusted. Thus, a contrast of the image formed by the liquid crystal panel 453 and, consequently, the image projected by the projection optical device 46, can be improved.

Modifications

Note that the scope of the invention is not restricted to the above-described exemplary embodiment, but includes modifications and improvements as long as the modifications and improvements are compatible with an object of the invention.

Though the gear 533 rotates in conjunction with the pinion gear 531 via the gear 532 in the exemplary embodiment, the gear 533 may be configured in a different manner. For instance, the gear 533 may be directly meshed with the pinion gear 531. In this case, it is preferable that the gear 533 is formed of an anti-backlash gear.

Though the gear 533 includes the shaft 5332 in the exemplary embodiment, the gear 533 may be configured in a different manner. Specifically, the gear 533 may include no shaft 5332 and the cover member 54 may include a rotary shaft configured to support the gear 533 in a rotatable manner. Similarly, the gear 534 may include no shaft 5342 and the cover member 54 may include a rotary shaft configured to support the gear 534 in a rotatable manner.

Though the gear 532 is attached to the rotary shaft 545 of the cover member 54 in the exemplary embodiment, the gear 532 may be configured in a different manner. For instance, the gear 532 may include a shaft that is rotatably supported by a bearing formed on the cover member 54.

Though the light shields 55, 56 are attached to the gears 533, 534 from the −X-direction side of the cover member 54 in the exemplary embodiment, the light shields 55, 56 may be attached in a different manner. For instance, openings allowing the shaft 5332 of the gear 533 and the shaft 5342 of the gear 534 to be exposed as seen from the +X-direction side may be provided on the base 51. Then, the light shields 55, 56 may be attached to the gears 533, 534 through the openings from the +X-direction side of the base 51.

It should be noted, however, that the distances between the base 51 and the light shields 55, 56 can be lengthened in the exemplary embodiment in that the movement mechanism 53 and the cover member 54 are interposed between the base 51 and the light shields 55, 56 in the +X-direction. Accordingly, the motor 52, the wiring board 58 and the sensor 59 provided on the base 51 are less likely to be influenced by the heat generated by the light incident on the light shield 55, 56.

Though the light shields 55, 56 are attached to the shafts 5332, 5342 of the gears 533, 534 in the exemplary embodiment, the light shields 55, 56 may be attached in a different manner. For instance, the light shields 55, 56 may be attached to any portions of the gears 533, 534 other than the shafts 5332, 5342.

Though the heat radiators 554, 564 are provided to the attachment portions 553, 563 of the light shields 55, 56 in the exemplary embodiment, the heat radiators 554, 564 may be configured in a different manner. For instance, the heat radiators 554, 564 may be provided on the extension portions 552, 562 of the light shields 55, 56. Further, it is not necessary for the light shields 55, 56 to have the heat radiators 554, 564.

Though the light adjuster 5 is disposed between the first lens array 421 and the second lens array 422 in the exemplary embodiment, the light adjuster 5 may be disposed in a different manner. For instance, the light adjuster 5 may be disposed on a light-exit side of the second lens array 422. In other words, the light adjuster 5 may be disposed at any position as long as the light adjuster 5 is capable of adjusting the light beam incident on the liquid crystal panel 453.

Though the image projection device 4 is a substantially L-shaped component in the exemplary embodiment, the image projection device 4 may alternatively be, for instance, a substantially U-shaped component.

Though the projector 1 includes the three liquid crystal panels 453 in the exemplary embodiment, the invention is applicable to a projector including two or less or four or more liquid crystal panels 453.

Though a transmissive liquid crystal panel having different light-incident side and light exit side is used in the exemplary embodiment, a reflective liquid crystal panel having common light-incident side and light exit side may be used. Further, an optical modulator other than a liquid crystal panel such as a device using a micromirror and a DMD (Digital Micromirror Device) may be used as long as the optical modulator is capable of modulating the incident light beam and forming an image in accordance with image information.

What is claimed is:

1. A light adjuster comprising:
   a first light shield and a second light shield disposed across a central axis of an emitted light beam and configured to enter the light beam to shield at least a part of the light beam;
   a drive section configured to generate a driving force;
   a movement mechanism configured to move the first light shield and the second light shield using the driving force;
   a board; and
   a cover member attached to the board, wherein:
   the movement mechanism comprises:
     a pinion gear provided to the drive section; and
     a first gear and a second gear configured to be rotated in conjunction with a rotation of the pinion gear,
   the first light shield is attached to the first gear,
   the second light shield is attached to the second gear,
   the cover member comprises:
     a body portion attached to the board to cover the pinion gear, the first gear and the second gear;
     a support portion provided to the body portion to support the first gear and the second gear so that the first gear and the second gear are rotatable;
     a first opening provided to the body portion and configured to expose a part of the first gear; and
     a second opening provided to the body portion and configured to expose a part of the second gear, and
   the support portion comprises cylindrical first and second support portions projecting from outer peripheral edges of the first and second openings, respectively.

2. The light adjuster according to claim 1, wherein
the first light shield is attached to the first gear through the first opening, and
the second light shield is attached to the second gear through the second opening.
3. The light adjuster according to claim 1, wherein the cover member comprises:
a pair of locking portions provided to the body portion and locked on an outer peripheral edge of the board.
4. The light adjuster according to claim 1, wherein
the movement mechanism comprises an intermediate gear meshing with the pinion gear and the first gear,
the intermediate gear is an anti-backlash gear comprising:
a first intermediate gear meshing with the pinion gear;
a second intermediate gear meshing with the pinion gear to be coaxially rotated with the first intermediate gear;
a biasing member configured to bias the first intermediate gear and the second intermediate gear; and
a third intermediate gear configured to be coaxially rotated with the second intermediate gear and meshing with the first gear.
5. The light adjuster according to claim 1, wherein the first light shield comprises:
a first attachment portion attached to the first gear; and
a first heat release portion provided to the first attachment portion, and
the second light shield comprises:
a second attachment portion attached to the second gear; and
a second heat release portion provided to the second attachment portion.
6. A projector comprising:
a light source;
an optical modulator configured to modulate a light beam emitted from the light source;
a projection optical device configured to project the light beam modulated by the optical modulator; and
the light adjuster according to claim 1 disposed in an optical path of the light beam emitted from the light source to be incident on the optical modulator.
7. A light adjuster comprising:
a first light shield and a second light shield disposed across a central axis of an emitted light beam and configured to enter the light beam to shield at least a part of the light beam;
a drive section configured to generate a driving force;
a movement mechanism configured to move the first light shield and the second light shield using the driving force;
a board; and
a cover member attached to the board, wherein
the movement mechanism comprises:
a pinion gear provided to the drive section; and
a first gear and a second gear configured to be rotated in conjunction with a rotation of the pinion gear,
the first light shield is attached to the first gear,
the second light shield is attached to the second gear, and
the cover member supports the first gear and the second gear so that the first gear and the second gear are rotatable and comprises:
a body portion attached to the board to cover the pinion gear, the first gear and the second gear; and
a pair of locking portions provided to the body portion and locked on an outer peripheral edge of the board.
8. The light adjuster according to claim 7, wherein the cover member comprises:

a support portion provided to the body portion to support the first gear and the second gear so that the first gear and the second gear are rotatable.
9. The light adjuster according to claim 7, the cover member comprising:
a first opening configured to expose a part of the first gear; and
a second opening configured to expose a part of the second gear, wherein:
the first light shield is attached to the first gear through the first opening, and
the second light shield is attached to the second gear through the second opening.
10. The light adjuster according to claim 7, wherein:
the movement mechanism comprises an intermediate gear meshing with the pinion gear and the first gear,
the intermediate gear is an anti-backlash gear comprising:
a first intermediate gear meshing with the pinion gear;
a second intermediate gear meshing with the pinion gear to be coaxially rotated with the first intermediate gear;
a biasing member configured to bias the first intermediate gear and the second intermediate gear; and
a third intermediate gear configured to be coaxially rotated with the second intermediate gear and meshing with the first gear.
11. The light adjuster according to claim 7, the first light shield comprising:
a first attachment portion attached to the first gear; and
a first heat release portion provided to the first attachment portion, and
the second light shield comprising:
a second attachment portion attached to the second gear; and
a second heat release portion provided to the second attachment portion.
12. A projector comprising:
a light source;
an optical modulator configured to modulate a light beam emitted from the light source;
a projection optical device configured to project the light beam modulated by the optical modulator; and
the light adjuster according to claim 7 disposed in an optical path of the light beam emitted from the light source to be incident on the optical modulator.
13. A light adjuster comprising:
a first light shield and a second light shield disposed across a central axis of an emitted light beam and configured to enter the light beam to shield at least a part of the light beam;
a drive section configured to generate a driving force;
a movement mechanism configured to move the first light shield and the second light shield using the driving force;
a board; and
a cover member attached to the board, wherein:
the movement mechanism comprises:
a pinion gear provided to the drive section;
a first gear and a second gear configured to be rotated in conjunction with a rotation of the pinion gear; and
an intermediate gear meshing with the pinion gear and the first gear,
the first light shield is attached to the first gear,
the second light shield is attached to the second gear,
the cover member supports the first gear and the second gear so that the first gear and the second gear are rotatable and is attached to the board to cover the pinion gear, the first gear and the second gear, and the intermediate gear is an anti-backlash gear comprising:
- a first intermediate gear meshing with the pinion gear;
- a second intermediate gear meshing with the pinion gear to be coaxially rotated with the first intermediate gear;
- a biasing member configured to bias the first intermediate gear and the second intermediate gear; and
- a third intermediate gear configured to be coaxially rotated with the second intermediate gear and meshing with the first gear.

14. The light adjuster according to claim 13, the cover member comprising:
- a body portion attached to the board to cover the pinion gear, the first gear and the second gear; and
- a support portion provided to the body portion to support the first gear and the second gear so that the first gear and the second gear are rotatable.

15. The light adjuster according to claim 13, the cover member comprising:
- a first opening configured to expose a part of the first gear; and
- a second opening configured to expose a part of the second gear, wherein:
  - the first light shield is attached to the first gear through the first opening, and
  - the second light shield is attached to the second gear through the second opening.

16. The light adjuster according to claim 13, the first light shield comprising:
- a first attachment portion attached to the first gear; and
- a first heat release portion provided to the first attachment portion, and the second light shield comprising:
- a second attachment portion attached to the second gear; and
- a second heat release portion provided to the second attachment portion.

17. A projector comprising:
- a light source;
- an optical modulator configured to modulate a light beam emitted from the light source;
- a projection optical device configured to project the light beam modulated by the optical modulator; and
- the light adjuster according to claim 13 disposed in an optical path of the light beam emitted from the light source to be incident on the optical modulator.

18. A light adjuster comprising:
- a first light shield and a second light shield disposed across a central axis of an emitted light beam and configured to enter the light beam to shield at least a part of the light beam;
- a drive section configured to generate a driving force;
- a movement mechanism configured to move the first light shield and the second light shield using the driving force;
- a board; and
- a cover member attached to the board, wherein:

the movement mechanism comprises:
- a pinion gear provided to the drive section; and
- a first gear and a second gear configured to be rotated in conjunction with a rotation of the pinion gear, the first light shield is attached to the first gear,
the second light shield is attached to the second gear,
the cover member supports the first gear and the second gear so that the first gear and the second gear are rotatable, and is attached to the board to cover the pinion gear, the first gear and the second gear, the first light shield comprises:
- a first attachment portion attached to the first gear; and
- a first heat release portion provided to the first attachment portion, and the second light shield comprises:
- a second attachment portion attached to the second gear; and
- a second heat release portion provided to the second attachment portion.

19. The light adjuster according to claim 18, the cover member comprising:
- a body portion attached to the board to cover the pinion gear, the first gear and the second gear; and
- a support portion provided to the body portion to support the first gear and the second gear so that the first gear and the second gear are rotatable.

20. The light adjuster according to claim 18, the cover member comprising:
- a first opening configured to expose a part of the first gear; and
- a second opening configured to expose a part of the second gear, wherein:
  - the first light shield is attached to the first gear through the first opening, and
  - the second light shield is attached to the second gear through the second opening.

21. The light adjuster according to claim 18, wherein:
the first heat release portion comprises a plurality of first fins extending from the first attachment portion,
the second heat release portion comprises a plurality of second fins extending from the second attachment portion, and
the plurality of first fins and the plurality of second fins extend in a direction intersecting a flow direction of a cooling wind flowing along the first light shield and the second light shield.

22. A projector comprising:
- a light source;
- an optical modulator configured to modulate a light beam emitted from the light source;
- a projection optical device configured to project the light beam modulated by the optical modulator; and
- the light adjuster according to claim 18 disposed in an optical path of the light beam emitted from the light source to be incident on the optical modulator.

* * * * *